United States Patent
Waldeck et al.

(10) Patent No.: US 8,014,327 B2
(45) Date of Patent: Sep. 6, 2011

(54) OPTIMIZING REQUESTED DOWNLINK DATA BY ADJUSTING FRAME NUMBER BY MEASURING ACTUAL TRANSMISSION DELAY

(75) Inventors: Jonas Waldeck, Ljungsbro (SE); Magnus Björklund, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 224 days.

(21) Appl. No.: 12/440,102

(22) PCT Filed: Sep. 5, 2006

(86) PCT No.: PCT/SE2006/050314
§ 371 (c)(1), (2), (4) Date: Mar. 5, 2009

(87) PCT Pub. No.: WO2008/030152
PCT Pub. Date: Mar. 13, 2008

(65) Prior Publication Data
US 2010/0177647 A1    Jul. 15, 2010

(51) Int. Cl.
*H04B 7/00* (2006.01)
(52) U.S. Cl. ........ 370/310; 370/235; 370/252; 370/253; 370/395.4

(58) Field of Classification Search .................. 370/310, 370/395.4, 229–240, 252–253
See application file for complete search history.

(56) References Cited

U.S. PATENT DOCUMENTS

| | | | | |
|---|---|---|---|---|
| 4,905,233 | A * | 2/1990 | Cain et al. | 370/237 |
| 6,141,336 | A * | 10/2000 | Bauchot et al. | 370/348 |
| 6,295,285 | B1 * | 9/2001 | Whitehead | 370/329 |
| 6,977,903 | B1 * | 12/2005 | Ohtani et al. | 370/252 |
| 2002/0045458 | A1 * | 4/2002 | Parantainen et al. | 455/466 |
| 2004/0131014 | A1 * | 7/2004 | Thompson et al. | 370/230 |
| 2007/0076723 | A1 * | 4/2007 | Chen | 370/395.4 |

FOREIGN PATENT DOCUMENTS

JP  2001053759 A * 2/2001
WO  WO 9508899 A1 * 3/1995

* cited by examiner

*Primary Examiner* — Hassan Kizou
*Assistant Examiner* — Ashil Farahmand

(57) ABSTRACT

The invention relates to a method and an arrangement for optimizing a link latency on a communication interface in a communication network comprising a first communication network node (18) and a second communication network node (16) communicating with said first communication network node (18) on said communication interface and sending framed data packets having frame numbers to a plurality of user equipments over a radio interface. A transmission delay on said communication interface is measured and downlink data having an adjusted frame number based on said measured transmission delay is requested.

15 Claims, 4 Drawing Sheets

OPTIMIZING REQUESTED DOWNLINK DATA BY ADJUSTING FRAME NUMBER BY MEASURING ACTUAL TRANSMISSION DELAY

TECHNICAL FIELD

The present invention relates to a method and an arrangement in a communication network and, particularly, to an arrangement allowing for optimizing a link latency on a communication interface in a communication network as well as a method for such optimization. The invention further relates to a computer-readable medium containing computer program for optimizing link latency on a communication interface in a communication network.

BACKGROUND OF THE INVENTION

The Global System for Mobile Communication (GSM) is one of the most widely deployed communication standards for mobile wireless communication. As an extension of GSM in order to introduce packet-switched technology. General Packet Radio Service (GPRS) was developed by the European Telecommunications Standards Institute (ETSI). One limitation of GPRS is that it does not support voice services. Therefore, the Third Generation Partnership Project (3GPP) has developed a new standard for GSM to support high rate data services. This standard is known as Enhanced Data Rates for Global Evolution (EDGE).

A network according to these standards comprises a core network (CN), radio access networks (RAN) and mobile stations (MS) attached to a RAN, such as the GSM/EDGE Radio Access Network (GERAN) architecture. The GERAN comprises a plurality of base station systems (BSS) and each of these BSSs comprises a base station controller (BSC) and a set of base transceiver stations (BTS).

In a BSS system where the radio link control/medium access control (RLC/MAC) protocol is centralized, the physical layer latency (e.g. packet transfer and serialization delays) easily becomes a vital part of the total latency consequently adding end-to-end delays for packet switched traffic.

A centralized RLC/MAC Protocol needs to maintain synchronization over the physical layer at all times. This is critical to maintain the RLC/MAC Scheduler synchronized with the BTS.

A GPRS/EDGE BSS system must also be able to handle transmission network congestion, micro-link induced packet losses, satellite link delays, busy hours load etc., etc. The conclusion is that in order to efficiently handle permanent and variable delays and at the same time provide optimal GPRS/EDGE performance, a self regulated physical layer would be desired.

SUMMARY OF THE INVENTION

Accordingly, it is an objective with the present invention to provide an improved method for optimizing a link latency on a communication interface in a communication network comprising a first communication network node and a second communication network node communicating with said first communication network node on said communication interface and sending framed data packets having frame numbers to a plurality of user equipments over a radio interface.

Another objective with the present invention is to provide an improved arrangement for optimizing a link latency on a communication interface in a communication network comprising a first communication network node and a second communication network node communicating with said first communication network node on said communication interface and sending framed data packets having frame numbers to a plurality of user equipments over a radio interface.

A further objective with the present invention is to provide an improved computer-readable medium for optimizing a link latency on a communication interface in a communication network comprising a first communication network node and a second communication network node communicating with said first communication network node on said communication interface and sending framed data packets having frame numbers to a plurality of user equipments over a radio interface.

Thanks to the provision of a self regulated physical layer with an autonomously adjusted Round-Trip-Time (RTT), the end user will experience an improved GPRS/EDGE throughput and better interactivity.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

Figure 1:
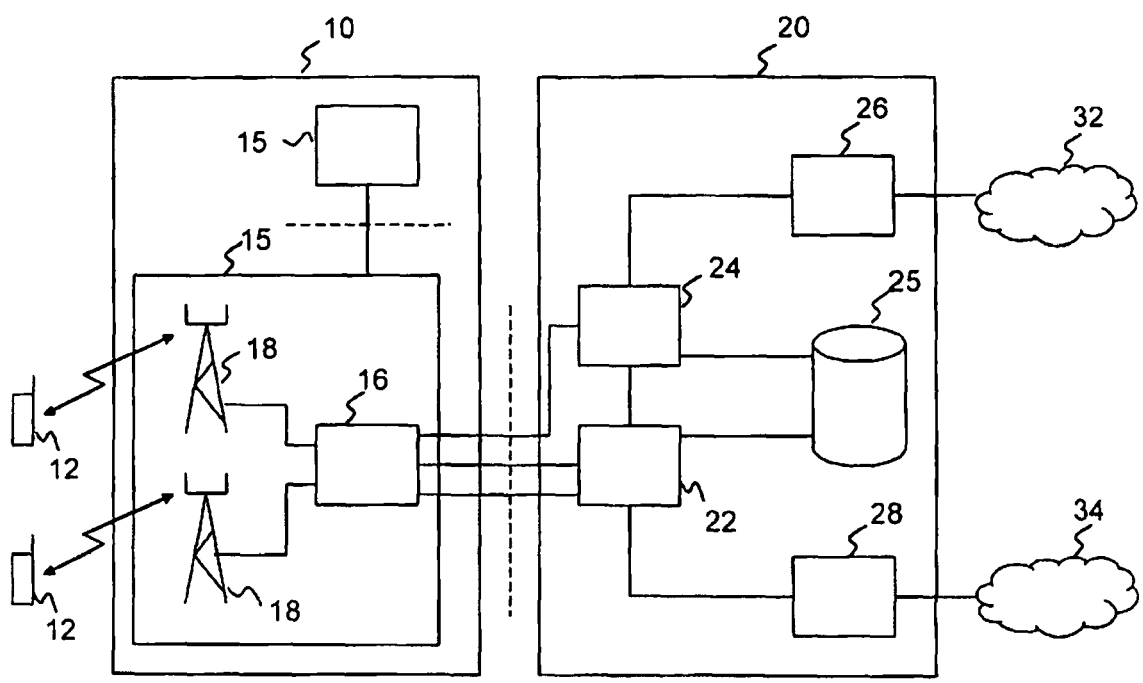
FIG. 1 is an exemplary block diagram of a mobile communication network.

A block diagram of an exemplary 3GPP system network is shown in FIG. 1. The network comprises a radio access network (RAN), which in the preferred embodiment of the present invention is a GSM/EDGE Radio Access Network (GERAN) 10 and a core network (CN) 20. The GERAN 10 and the CN 20 provide communication and control for a plurality of mobile stations (MS) or user equipments 12 through the Um interface, i.e. over a radio interface.

The GERAN architecture 10 comprises a plurality of Base Stations Systems (BSS) 15 each controlled by a Base Station Controller (BSC) 16 which is connected to a set of Base Transceiver Stations (BTS) 18. The BTSs 18 comprise the antennas, RF equipment and baseband processing circuits needed to communicate with the MSs 12. Thus, the BTS 18 could also be called the GSM RF handling unit. The BTSs 18 are connected to the BSC 16 through a communication interface which here is the Abis-interface.

The core network 20 typically comprises at least one Serving GPRS Support Node (SGSN) 22, one or more Gateway GPRS Support Node (GGSN) 28, at least one mobile switching center (MSC) 24, which may include a visitor location register (VLR) (not shown in FIG. 1), a Gateway MSC (GMSC) 26 and a GPRS home location register (HLR) 25.

The CN 20 provides both circuit-switched and packet data communication with various external networks, typically including the Public Switched Telephone Network (PSTN) 32 and one or more packet mode communication network, such as the Internet 34. The GERAN 10 connects to the CN 20 through the A, Gb and Iu interfaces.

Figure 2:
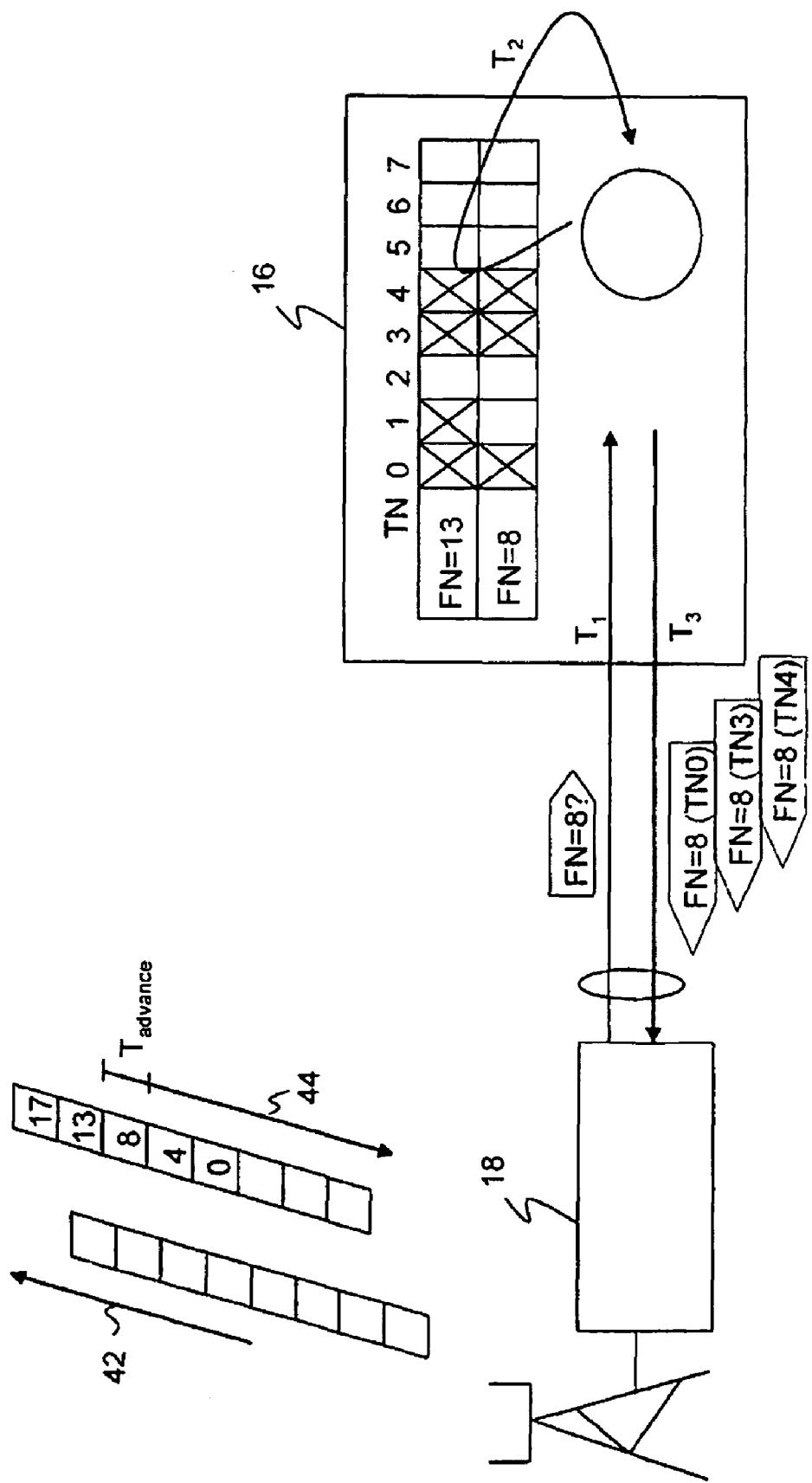
FIG. 2 is an exemplary block diagram of an inventive base station system.

FIG. 2 shows an inventive procedure overview of the BSS mechanism for an adaptive and asynchronous GPRS/EDGE Physical Layer. The inventive idea is to send each downlink data request in advance based on last known link delay, i.e. the BTS 18 sends the downlink data request in advance and, thus, generates the data bit rate. The BTS 18 requests GPRS/EDGE down link data towards the centralized RLC/MAC protocol located in the BSC 16 using the TDMA frame reference (FN) to be scheduled. The future frame number (or FN offset value) to use in the DL Data Request message is regulated based on the measured transmission delay.

The FN offset to use ($T_{advance}$) is autonomously measured by the BTS 18 and will quickly optimize (e.g. regulate) the link latency without loosing any RLC/MAC scheduling opportunities. $T_0$ is the start time of the procedure requesting DL data in $T_{advance}=T_1+T_2+T_3$, wherein $T_1$ is the time needed to transport a request to the remote RLC/MAC protocol, $T_2$ is the time needed to schedule the set of packet data channels (PDCH) for the RF resource in use and $T_3$ is the time needed to transport downlink data for the RF resource.

Data to be transmitted to a MS 12 is transferred from e.g. the SGSN 22 (shown in FIG. 1) to the BSC 16 wherein it is divided into packets and carried in time frames to the BTS 18 and further via the air interface, Um, to the MS 12. As can be seen in FIG. 2 each time frame, preferably, has 8 timeslots (0 to 7) and may carry more than one packet. In the example of FIG. 2, frame number 8 comprises 3 data packets in timeslots 0, 3 and 4 which have been scheduled and are in queue to be transmitted and, frame number 13 comprises 4 data packets in timeslots 0, 1, 3 and 4. Further in FIG. 2 is shown the bursts/radio blocks for TN in the Um interface in an uplink direction 42 and a downlink direction 44, wherein future bursts/radio blocks to send over the Um interface in the downlink direction 44 has been marked with the TDMA frame numbers 0, 4, 8, 13, 17 and in the example shown in FIG. 2, the adjusted frame number (no 8) to request based on the measured transmission delay has been marked with $T_{advance}$. The current burst position is at the start of frame number 0.

The BTS 18 has measured the transmission delay, $T_{advance}$, and is now requesting downlink data having an adjusted frame number, which in this example is 8, based on the measured transmission delay. Frame no 8 comprises 3 packets, TN0, TN3 and TN4, which are sent to the BTS 18 and further to the addressed MS 12.

The above described mechanism is applicable on both narrowband and wideband channels, but the benefit (e.g. the potential latency reduction) will improve with the higher bandwidth that can be used between the BTS 18 and the RLC/MAC handler in the BSS System 15.

When a Physical Link is wideband configured and shared with circuit switched (CS) speech traffic, the DTX silence and other idle time on the CS originated call can be momentarily used to trim the downlink GPRS/EDGE buffer sizes in the BTS.

In a network with very fast changing transmission delays, the regulation of the $T_{advance}$ combines lowest possible transport latency with high enough robustness. This type of delay variations can be expected using xDSL, satellite links or satellite relaying in other words all scenarios with variable wideband channel sizes between the RLC/MAC protocol and the BTS.

Instead of keeping a fix transmission delay over the Physical Link using conventional time based RLC/MAC synchronization; this invention suggests a mechanism to always optimize the link delay by measuring the actual transport delay. This will result in a self-adaptive asynchronous physical layer for best possible GPRS/EDGE performance.

Reducing the Uplink Load

When initiating polling for RLC/MAC scheduled data in the BTS, the uplink direction will have to handle all additional out-of-band requests of DL data. In order to reduce the amount of signaling between the BTS and the RLC/MAC Protocol, following mechanisms will improve the situation:

1) Since all packet data channels within one cell (e.g. frequency or transceiver) are frame number synchronized, only one DL Data Request per time slot group or BTS is needed in order to step the RLC/MAC scheduling period.
2) The DL data request sent to the RLC/MAC handler carries a countdown preset value. If preset=0, DL Data Request is sent every 20 ms (e.g. the bandwidth saving is off), if preset=1, one every 40 ms, and so on . . . If preset >0, the RLC/MAC protocol starts countdown with 20 ms timeout. At every timeout, the countdown value is decremented and a new DL Data Request is locally generated. This continues until countdown=0 or until a new preset value is sent from the BTS. The BTS shall always be set to generate as a minimum two preset values before the countdown in the RLC/MAC handler reaches zero. The minimum two presets are needed to avoid that loss of DL Data Requests over the physical link layer causes the lost of a scheduling opportunity in the RLC/MAC handler. In order not to affect the response times of the link delay regulation, all significant changes in measured link delay shall be notified to the RLC/MAC handling unit even if the next few DL Data Request are set to be self generated by the RLC/MAC unit.

The alternatives (1) and (2) above can be used at the same time.

Since the DL Data Requests message size can be much smaller than ordinary GPRS/EDGE payload messages, the additional UL bandwidth need for DL Data Requests originated from the BTS can be neglected.

Both method (1) and (2) can be applied without impacting the regulation of the link delay as long as all significant changes of link delay are immediately communicated to the RLC/MAC unit.

Quick Start-Up of On-Demand Channels

In order to generally reduce the startup time for on-demand channels in a network using asynchronous physical layer implementation, the last known link delay shall be stored within BSS. Using the stored delay as a preset value will result in that the BTS regulation and tuning of current link delay can get as good starting point as possible.

It is also possible to send a keep alive/measuring message to keep the stored link delay as up to date as possible, even when no dedicated radio resources are used.

Regulation in the BTS

The regulation algorithm used in the BTS will have to cope with different network scenarios. The delay jitter, wander and drop rate may look different from case to case. The algorithm shall be able to regulate the physical link characteristics towards high robustness or low latency depending on operator choice or the existing network scenario.

Figure 3:
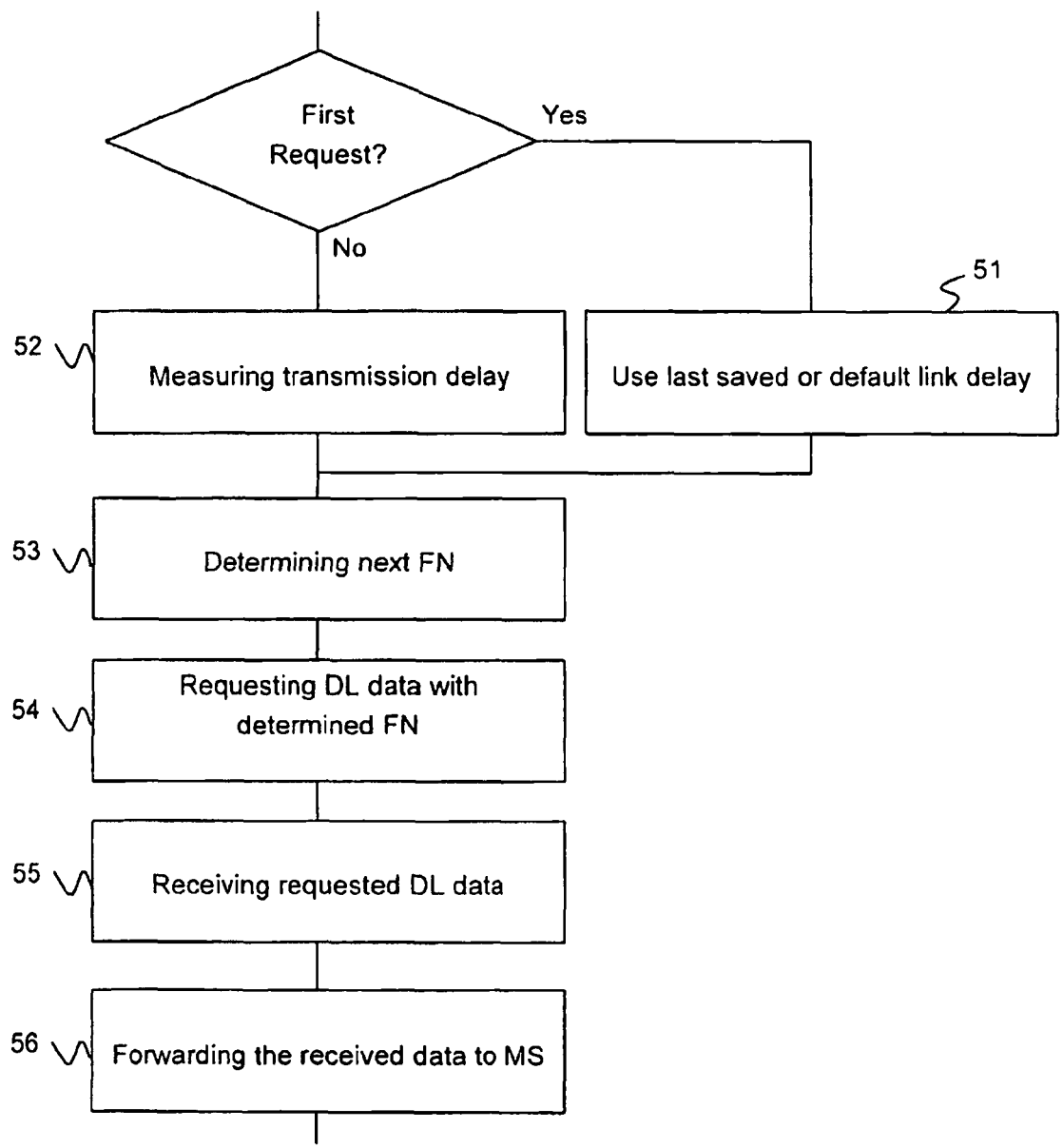
FIG. 3 is a flow chart showing the inventive method steps on a base station side in a communication network.

In a preferred embodiment of the present invention the procedure on the base station (BTS) side for optimizing a link latency on a communication interface in a communication network comprising a first communication network node (e.g. a BSC) and said base station communicating with said first communication network node on said communication interface and sending framed data packets having frame numbers to a plurality of user equipments over a radio interface, shown in FIG. 3, is as follows:

if the request for DL data is the first request, using last saved or default link delay (step 51) for determining frame number of the next packet to request (step 53);

otherwise, measuring a transmission delay on said communication interface (step 52) and using the measured transmission delay for determining frame number of the next packet to request (step 53);

requesting DL data having the determined frame number (step 54);

receiving the requested DL data having the determined frame number (step 55);

forwarding the received DL data to the MS (step 56).

Figure 4:
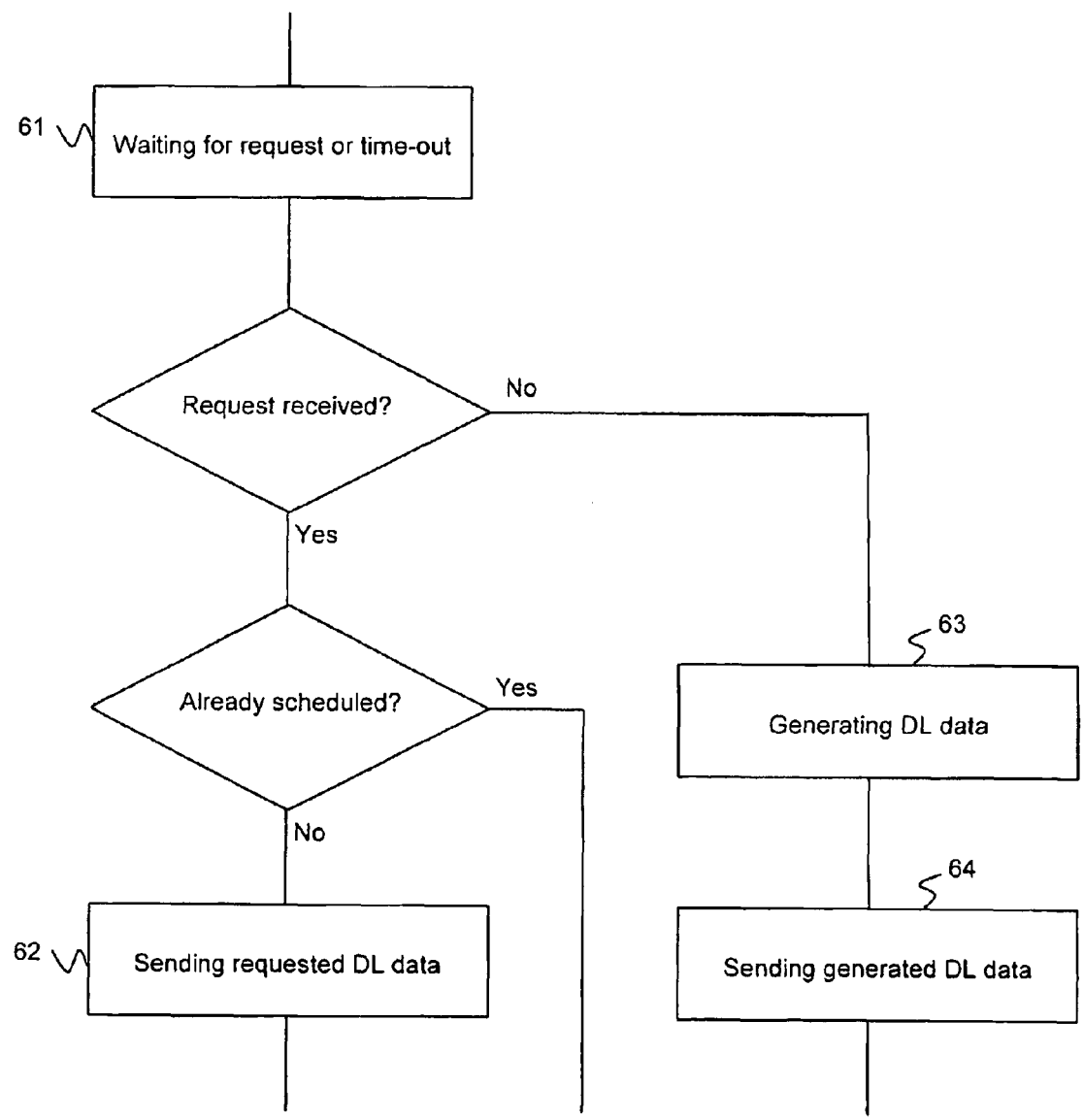
FIG. 4 is a flow chart showing the inventive method steps on a base station controller side in a communication network.

According to the preferred embodiment of the present invention, the procedure on the base station controller side for optimizing a link latency on a communication interface in a communication network comprising a first communication network node (base station controller) and a second communication network node (base station or BTS) communicating with said first communication network node on said communication interface and sending framed data packets having frame numbers to a plurality of user equipments over a radio interface, shown in FIG. 4, is as follows:

awaiting a request from the BTS to send DL data or awaiting a pre-determined period of time to end (timeout) (step 61);

if a request is received, checking if the requested DL data already has been scheduled and sent to the BTS. If the requested DL data not has been scheduled, sending the requested DL data having a frame number determined by the BTS to the BTS (step 62). Otherwise, ignoring the received request;

if a no request is received within the pre-determined period of time, generating frame number on next DL data to send (step 63) and sending DL data having the self-generated frame number to the BTS (step 64).

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for optimizing a link latency on a communication interface in a communication network comprising a first communication network node and a second communication network node communicating with said first communication network node on said communication interface and sending framed data packets having frame numbers to a plurality of user equipments over a radio interface, is provided wherein the computer program performs the steps of:

measuring a transmission delay on said communication interface;

requesting downlink data having an adjusted frame number based on said measured transmission delay.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

The invention claimed is:

1. A method for optimizing a link latency on a communication interface in a communication network including a first communication network node and a second communication network node communicating with said first communication network node on said communication interface, said method comprising the steps of:

sending framed data packets having frame numbers to a plurality of user equipments over a radio interface;

measuring a transmission delay on said communication interface by said second communication network node;

requesting downlink data from said first communication network node, said downlink data having an adjusted frame number based on said measured transmission delay;

wherein the step of measuring the transmission delay further comprises the steps of:

measuring a time needed to transport said downlink data request to said first communication network node;

measuring a time needed to schedule said data;

measuring a time needed to transport said requested downlink data to said second communication network node;

obtaining said measured transmission delay by adding said measured times.

2. The method according to claim 1, wherein the transmission delay is autonomously measured.

3. The method according to claim 1, wherein the method further in said first communication network node comprises the steps of:
   awaiting said downlink data request from said second communication network node;
   if said downlink data request is received, sending said requested downlink data to said second communication network node;
   otherwise if no request is received within a pre-determined period of time, generating downlink data and sending said generated downlink data to said second communication network node.

4. The method according to claim 1, wherein the method further comprises the step of using a last known transmission delay when requesting downlink data at start-up when said request is the first request.

5. The method according to claim 1, wherein the method further comprises the step of using a default value for the transmission delay when requesting downlink data at start-up when said request is the first request.

6. An arrangement for optimizing a link latency on a communication interface in a communication network including a first communication network node and a second communication network node communicating with said first communication network node on said communication interface, the second communication network node comprising a first processor configured for:
   sending framed data packets having frame numbers to a plurality of user equipments over a radio interface,
   measuring a transmission delay on said communication interface within said second communication network node;
   requesting downlink data having an adjusted frame number based on said measured transmission delay within said second communication network node,
   wherein measuring the transmission delay comprises
   measuring a time needed to transport said downlink data request to said first communication network node;
   measuring a time needed to schedule said data;
   measuring a time needed to transport said requested downlink data to said second communication network node;
   obtaining said measured transmission delay by adding said measured times.

7. The arrangement according to claim 5, wherein said second communication network node is arranged to autonomously measure said transmission delay.

8. The arrangement according to claim 5, wherein the arrangement further comprises in said first communication network node a second processor configured for:
   awaiting for said downlink data request from said second communication network node;
   sending said requested downlink data to said second communication network node if said downlink data request is received;
   generating downlink data whereby said first communication network node is arranged to send said generated, downlink data to said second communication network node if no request is received within a pre-determined period of time.

9. The arrangement according to claim 5, wherein the arrangement is further configured to use a last known transmission delay when requesting downlink data at start-up when said request is the first request.

10. The arrangement according to claim 5, wherein the arrangement is further configured to use a default value for transmission delay when requesting downlink data at start-up when said request is the first request.

11. A non-transitory computer-readable medium containing computer program for optimizing a link latency on a communication interface in a communication network including a first communication network node and a second communication network node communicating with said first communication network node on said communication interface, wherein the computer program performs the steps of:
   sending framed data packets having frame numbers to a plurality of user equipments over a radio interface;
   measuring a transmission delay on said communication interface;
   requesting downlink data having an adjusted frame number based on said measured transmission delay,
   wherein the step of measuring the transmission delay further comprises the steps of:
   measuring a time needed to transport said downlink data request to said first communication network node;
   measuring a time needed to schedule said data;
   measuring a time needed to transport said requested downlink data to said second communication network node;
   obtaining said measured transmission delay by adding said measured times.

12. The computer-readable medium of claim 9, wherein the transmission delay is autonomously measured.

13. The computer-readable medium of claim 9 wherein the method further in said first communication network node comprises the steps of:
   awaiting said downlink data request from said second communication network node;
   if said downlink data request is received, sending said requested downlink data to said second communication network node;
   otherwise if no request is received within a pre-determined period of time, generating downlink data and sending said generated downlink data to said second communication network node.

14. The computer-readable medium of claim 9 wherein the method further comprises the step of using a last known transmission delay when requesting downlink data at start-up when said request is the first request.

15. The computer-readable medium of claim 9 wherein the method further comprises the step of using a default value for the transmission delay when requesting downlink data at start-up when said request is the first request.

* * * * *

UNITED STATES PATENT AND TRADEMARK OFFICE
CERTIFICATE OF CORRECTION

PATENT NO. : 8,014,327 B2  
APPLICATION NO. : 12/440102  
DATED : September 6, 2011  
INVENTOR(S) : Waldeck et al.

Page 1 of 1

It is certified that error appears in the above-identified patent and that said Letters Patent is hereby corrected as shown below:

In Column 1, Line 22, delete "technology." and insert -- technology, --, therefor.

In Column 2, Line 67, delete "26" and insert -- 26, --, therefor.

In Column 4, Line 62, delete "invention" and insert -- invention, --, therefor.

In Column 5, Line 63, delete "optical" and insert -- optical, --, therefor.

Signed and Sealed this
Sixth Day of March, 2012

David J. Kappos
*Director of the United States Patent and Trademark Office*